3,121,663
CARBON DIOXIDE RELEASING LAXATIVE
SUPPOSITORY
Howard E. Parker, Bryan, Ohio, assignor, by mesne assignments, to Plough Laboratories, Inc., Memphis, Tenn., a corporation of Tennessee
No Drawing. Filed Feb. 9, 1956, Ser. No. 564,369
6 Claims. (Cl. 167—64)

This invention relates to an improved rectal suppository having a laxative effect and to a novel process for its manufacture, and is more particularly concerned with a smooth, coated, compressed tablet suppository having improved qualities.

The suppository of the present invention has a purgative or laxative effect when placed in the rectum and thus eliminates the necessity for conventional aqueous enemas, glycerine suppositories, et cetera. The suppositories when placed in contact with the moisture of the rectum, dissolve and liberate carbon doxide gas, which stimulates the peristaltic and defecation reflexes.

The closest art of which I am aware is the rectal suppository, described in the October 7, 1953, issue of The Proceedings of the Staff Meetings of the Mayo Clinic, which contains sodium bicarbonate, potassium bitartrate, calcium silicate, bentonite, polyethylene glycol, Dextran 282, cocoa butter, vegetable lecithin and talc. This suppository, manufactured by Pharmacia Laboratories in the form of a long, narrow tablet coated with the cocoa butter, usually takes about thirty minutes to produce evacuation after being inserted in the rectum, does not dissolve completely, and leaves a greasy residue.

An object of the present invention is to make an easily insertable rectal suppository which acts rapidly to produce a laxative effect and which is not sticky, greasy or otherwise unpleasant to use, and which quickly dissolves almost completely in the body without leaving a messy residue. Another object is to make a suppository which begins to give off carbon dioxide gas as soon as it is inserted in the rectum, and which does not require that the suppository coating be melted off before the active components can react. Still another object is to make a rectal suppository from which the amount of carbon dioxide gas given off can be accurately calculated in advance and exactly reproduced on a large scale. A further object is to prepare a rectal suppository which can be manufactured easily and at relatively low cost.

My novel suppositories contain a carbon dioxide source material and a carbon dioxide release agent (in the stoichiometric amounts required to produce the desired amount of carbon dioxide gas upon reaction) in an inactive, water-soluble wax-like carrier. Suitable carbon dioxide source materials include sodium bicarbonate, potassium bicarbonate, and the like. Suitable carbon dioxide release agents include sodium biphosphate, potassium bitartrate, and the like. I prefer to use sodium bicarbonate and sodium biphosphate (sodium phosphate monobasic) since these materials are natural to the body, it having been found that the bicarbonate, sodium, and monobasic phosphate ions are the means by which kidney control is handled in the body ("The Pharmacological Basis of Therapeutics," by Goodman and Gilman). The best inactive carrier known to me is a water-soluble synthetic wax such as is marketed by Union Carbide Corporation under the trademark "Carbowax." I prefer to use Carbowax Number 6000 (a hard, white, waxy solid obtained in flake form) although other Carbowaxes, for example, Numbers 4000 or 10,000 may be used.

Carbowax is a solid polyethylene glycol of the general formula: $HOCH_2(CH_2OCH_2)_xCH_2OH$. Carbowax 4,000 is a white, waxy solid having a molecular weight of between about 3,000 and about 3,700, while Carbowax 10,000 is a hard wax having an molecular average weight of about 10,000. Carbowax 6,000 has an average molecular weight of 6,000–7,500.

An effective suppository tablet can be made containing nothing but sodium bicarbonate, sodium biphosphate, and water-soluble synthetic wax (Carbowax) where the synthetic dissolved in a small amount of alcohol is used to spray-coat or dip-coat the edges of a compressed tablet. Such a suppository will usually produce evacuation in about 15 minutes. However, a suppository made only from these ingredients, although operative, tends to harden upon aging and takes longer to be effective when finally used.

I have found certain improved forms of my basic suppository which disintegrate even faster in the rectum and have an improved shelf-life. I have found that by the addition of starch (preferably corn starch) or finely-divided cellulose produced from purified wood cellulose (Solka-Floc) to my basic composition, the speed of disintegration of my suppository in the rectum is greatly increased. Of these improved forms, I prefer that one containing starch, since while both finely-divided cellulose (Solka-Floc) and starch serve to speed the entrance of water to the active ingredients, the starch also aids in the lubrication of the tablet and permit easier compression. Another improved form of my basic suppository involves the use of magnesium stearate, which improves the appearance of my suppository and facilitates the compression of the ingredients into a tablet. These improved forms of my suppository begin to produce carbon dioxide gas immediately upon contact with the moisture of the rectum, dissolving completely (or almost completely, leaving only a non-sticky, easily-removed residue) in less than 15 minutes to produce evacuation.

I can make my suppositories by two methods. In the first, I vary the amounts of my ingredients in accord with the amount of carbon dioxide desired to be produced and the desired total weight of the suppository. The water-soluble synthetic wax (Carbowax Number 6000) is dissolved in alcohol to produce a heavy paste. This paste is used to granulate the sodium bicarbonate and the (previously dried) sodium biphosphate separately. The granules are then carefully dried. The drying temperature is important. It must be high enough to dry off the alcohol and any moisture that may be present, and to soften the water-soluble synthetic wax so that it penetrates into and around the sodium bicarbonate and sodium biphosphate. If the temperature is so high as to completely melt the synthetic wax then a solid paste rather than the desired granules is produced. The granules are then allowed to cool. Air conditioning facilities in the cooling room are beneficial but not essential. The cool granules are sized and weighed. Sufficient Carbowax Number 6000 is then added to bring the total weight to the desired figure. A small amount of magnesium stearate may be added if desired. Such addition helps to reduce the problem of compression in making the suppository tablets. Measured quantities of the separate kinds of granules are now weighed out so that there is the requisite amount of each kind of granule available. These are compressed into a tablet of any desired shape. I have found the tear or elongated drop shape to be preferable. The finished compressed tablet is then dipped or sprayed with relatively low viscosity synthetic wax (Carbowax 400 or a related type wax) to seal off any exposed particles left by the compression process and to add a fine external film for aid in insertion in the rectum. When the suppository is ready for actual use, insertion is aided by moistening the tablet.

The following example will serve to better illustrate my invention. It shows my process for making suppositories having a weight of two grams (32 grains) and which will produce 0.25 gram of carbon dioxide gas when used. I use approximately 0.7 gram (10.8 grains) of sodium bicarbonate, 0.8 gram (12.3 grains) of sodium biphosphate and 0.5 gram (7.7 grains) of water-soluble synthetic wax (Carbowax Number 6000). One-half of the synthetic wax (Carbowax Number 6000) is dissolved in just sufficient ethyl alcohol to produce a heavy paste. This paste is used to granulate the sodium bicarbonate and sodium biphosphate, each of which is granulated separately. The separate granules are then dried in a dryer at 50 degrees centigrade for about four hours to remove the alcohol. The dried granules are allowed to cool to room temperature. Then they are passed through the proper sized screen and weighed. The sodium bicarbonated granules and the sodium phosphate monobasic granules are mixed with about one-fifth (⅕) grain of magnesium stearate, and compressed into a tear-shaped tablet. The compressed tablet is coated by being dipped in a solution of a water-soluble synthetic wax in liquid form at room temperature (Carbowax Number 400). The excess of the wax coating is allowed to drain off and the finished suppository is allowed to dry. The suppository is now ready for use.

My second method as illustrated by the following examples shows my preferred process for making the preferred embodiment of my invention on a commercial scale. The following amounts of materials are used to make 35,000 suppository tablets, each individual tablet containing about 0.8 gram of sodium biphosphate and 0.7 gram of sodium bicarbonate and having a total weight of about 1.9 grams:

| | Pounds |
|---|---|
| Sodium biphosphate | 62 |
| Sodium bicarbonate | 54 |
| Water-soluble synthetic wax (Carbowax Number 6000) | 33 |
| Starch (corn) | 6 |
| Magnesium stearate | 1 |
| Starch (corn) | As needed (q.s. ad) |

The sodium biphosphate was weighed and dried overnight in a dryer to remove the moisture normally present. The corn starch was dried. Sixty-two pounds of dried sodium biphosphate, eleven pounds of water-soluble synthetic wax (Carbowax Number 6000) and six pounds of corn starch were weighed out and passed through a Fitzpatrick comminuting machine equipped with a number two screen. Five pounds eight ounces of the synthetic wax (Carbowax Number 6000) was melted in a steam bath, and then dissolved in nine pints of ethyl alcohol (Shellacol). The alcohol-dissolved synthetic wax was used to granulate the comminuted admixture. The wet granules were passed through a number four screen, and then placed in a dryer.

Fifty-four pounds of sodium bicarbonate and eleven pounds of the synthetic wax (Carbowax Number 6000) were passed through the cleaned Fitzpatrick machine equipped with a number two screen. The comminuted admixture was granulated with a solution of five pounds eight ounces of synthetic wax (Carbowax Number 6000) dissolved in seven pints of ethyl alcohol (Shellacol). The wet granules were passed through a number four screen and placed in a dryer.

Both granulations were dried at temperatures below 120 degrees Fahrenheit. The granulations were then removed from the dryer, cooled, passed through a number twelve screen, mixed together and weighed.

One pound of magnesium stearate was added and sufficient dried corn starch was added to bring the total batch weight to 155 pounds.

The granules were mixed and compressed into tear-shaped tablets. The tablets were placed in a coating pan and slowly rotated while being uniformly covered with a thin film of low viscosity water-soluble synthetic wax (Carbowax Number 400). (The synthetic wax alone or in a Carbowax 4000-alcohol solution was sprayed [atomized] on from a pressure-type spray gun. One pint is sufficient for a 35,000 tablet batch). The tableted suppositories were now ready for use.

The use of starch and magnesium stearate in the above example was optional. The low viscosity synthetic wax (Carbowax Number 400) could be used as a coating dip, but this results in an excess of wax-like coating on the tablets, and tends to harden the tablets upon aging.

It is to be understood that the invention is not to be limited to the exact details of operation or exact formulations shown and described, as obvious modifications and equivalents will be apparent to one skilled in the art, and the invention is to be limited only by the scope of the appended claims.

I claim:

1. A suppository composition consisting essentially of polyethylene glycol which is solid at normal temperatures, sodium bicarbonate and sodium biphosphate.

2. A suppository composition consisting essentially of polyethylene glycol which is solid at normal temperatures, sodium bicarbonate and dehydrated sodium biphosphate.

3. A suppository composition consisting essentially of two mixtures, one mixture consisting of sodium bicarbonate dispersed in polyethylene glycol, the other mixture consisting of sodium biphosphate dispersed in polyethylene glycol, the polyethylene glycol of each mixture being solid at normal temperatures and being effective to form a protective film over the salt dispersed therein thereby insulating such salt from the salt in the other mixture.

4. A suppository composition consisting essentially of polyethylene glycol which is solid at normal temperatures; sodium bicarbonate; sodium biphosphate, and a small amount of magnesium stearate.

5. A suppository composition consisting essentially of polyethylene glycol which is solid at normal temperatures; sodium bicarbonate; sodium biphosphate, and a small amount of starch.

6. A suppository composition consisting essentially of polyethylene glycol which is solid at normal temperatures; sodium bicarbonate; sodium biphosphate, and a small amount of finely divided cellulose.

References Cited in the file of this patent

UNITED STATES PATENTS

| 1,707,762 | Homan | Apr. 2, 1929 |
| 2,584,166 | Stevenson et al. | Feb. 5, 1952 |

FOREIGN PATENTS

| 368,423 | Great Britain | Mar. 10, 1932 |
| 19,818 | Australia | Oct. 20, 1934 |

OTHER REFERENCES

Merck Index, 6th ed., Merck & Co., Inc., Rahway, N.J. (1952), pp. 202–203.

Hassler: J.A.P.A., Practical Pharm. Ed., vol. 14, No. 1, January 1953, pp. 26–27 and 54.

Gross et al.: J.A.P.A., Scientific Ed., vol. XLII, No. 2, February 1953, pp. 90–95, esp. 93.

Banner: Proceedings of the Staff Meetings of the Mayo Clinic, Oct. 7, 1953, vol. 28, No. 20, pp. 567–8.

Frazier et al.: A Formulary for External Therapy of the Skin, Charles Thomas Publ., Springfield, Ill., p. 66.